(12) United States Patent
Barber et al.

(10) Patent No.: US 10,657,182 B2
(45) Date of Patent: May 19, 2020

(54) SIMILAR EMAIL SPAM DETECTION

(71) Applicant: International Business Machines Corporation, Armonk, NY (US)

(72) Inventors: Mark H. Barber, Upper Coomera (AU); Carsten Hagemann, Ashmore (AU); Christopher J. Hockings, Burleigh Waters (AU)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 15/270,237

(22) Filed: Sep. 20, 2016

(65) Prior Publication Data

US 2018/0081991 A1 Mar. 22, 2018

(51) Int. Cl.
*G06F 16/903* (2019.01)
*G06F 16/951* (2019.01)
*G06F 16/35* (2019.01)
*H04L 12/58* (2006.01)
*G06F 7/02* (2006.01)
*H04L 29/06* (2006.01)

(52) U.S. Cl.
CPC .......... *G06F 16/90335* (2019.01); *G06F 7/02* (2013.01); *G06F 16/353* (2019.01); *G06F 16/951* (2019.01); *H04L 51/12* (2013.01); *H04L 63/1441* (2013.01)

(58) Field of Classification Search
CPC ...... G06F 15/16; G06F 7/02; G06F 16/90335; G06F 16/951; G06F 16/353
USPC .......................................... 709/206; 707/769
See application file for complete search history.

(56) References Cited

U.S. PATENT DOCUMENTS

| 7,739,337 | B1 | 6/2010 | Jensen |
| 7,797,443 | B1 | 9/2010 | Pettigrew et al. |
| 7,882,192 | B2 * | 2/2011 | Rajan ............... H04L 51/12 |
| | | | 348/153 |
| 8,204,945 | B2 | 6/2012 | Milliken et al. |
| 8,925,087 | B1 | 12/2014 | Oliver et al. |
| 8,966,620 | B2 | 2/2015 | Hines et al. |
| 2005/0108340 | A1 | 5/2005 | Gleeson et al. |

(Continued)

OTHER PUBLICATIONS

Dasgupta et al., "Method and System for Filtering Email Spam by Combining Similarity Graphs," IP.com Prior Art Database Technical Disclosure, IP.com No. IPCOM000204186D, Feb. 17, 2011, 8 pages. http://ip.com/IPCOM/000204186.

(Continued)

*Primary Examiner* — Shahid A Alam
(74) *Attorney, Agent, or Firm* — Nathan M. Rau

(57) ABSTRACT

Disclosed herein is a system and method for identifying a spam email message. To identify a spam message a similarity measurement hash and a sender hash is generated for each email message. Two or more previously received email messages are compared with an incoming email message. The incoming email message is identified as a spam message when the similarity measurement hash between incoming message and one of the received messages matches and the corresponding sender hash does not match. The system may integrate with other email servers through a DNS to identify spam emails across different organizations and locations. The system and method may further apply rules to particular match to whitelist a potential spam email.

1 Claim, 9 Drawing Sheets

(56) References Cited

U.S. PATENT DOCUMENTS

| | | | |
|---|---|---|---|
| 2005/0210258 A1* | 9/2005 | Birrell | H04L 51/12 |
| | | | 713/178 |
| 2006/0095521 A1* | 5/2006 | Patinkin | G06Q 10/107 |
| | | | 709/206 |
| 2006/0095966 A1 | 5/2006 | Park | |
| 2006/0149820 A1 | 7/2006 | Rajan et al. | |
| 2006/0149821 A1* | 7/2006 | Rajan | G06Q 10/107 |
| | | | 709/206 |
| 2009/0063371 A1 | 3/2009 | Lin | |

OTHER PUBLICATIONS

Thomas et al., "Method and System for Jointly Detecting Spammer and Spam Emails with Minimal Supervised Effort," IP.com Prior Art Database Technical Disclosure, IP.com No. IPCOM000237447D, Jun. 18, 2014, pp. 1-12 http://ip.com/IPCOM/000237447.

"DNSBL," Wikipedia, the free encyclopedia, https://en.wikipedia.org/wiki/DNSBL, (printed Feb. 11, 2016), 3 pages.

"Domain Name System," Wikipedia, the free encyclopedia, https://en.wikipedia.org/wiki/Domain_Name_System, (printed Feb. 11, 2016), 7 pages.

"IPv6," Wikipedia, the free encyclopedia, https://en.wikipedia.org/wiki/IPv6, (printed Feb. 11, 2016), 7 pages.

IBM, "Lotus Protector for Mail Security," http://www-03.ibm.com/software/products/en/protector, (printed Feb. 11, 2016), 1 page.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

* cited by examiner

SIMILAR EMAIL SPAM DETECTION

BACKGROUND

Aspects of the present disclosure relate to a spam email detection system; more particular aspects relate to using hashes for spam detection in similar emails.

Email spam or unsolicited bulk email (UBE) involves sending nearly identical messages though the internet to multiple users. UBE or unsolicited emails henceforth referred to as "spam" (e.g., spam emails, spam messages, or junk mail) are utilized in cyber-attacks to obtain user information. The messages may include malware, or links to phishing websites intended to cause harm to the receiver of the email. Spam email detection may protect the users of the mail server from identity theft, or harm to the user's computer.

SUMMARY

According to embodiments of the present disclosure a process for determining if an email is a spam email is disclosed. The process begins by receiving a first email at a first mail server and creating a sender hash of the first email. Following the creation of the sender hash the process creates one or more similarity measurement hashes of the first email including a first similarity measurement hash. The process then queries a centralized storage system for one or more similarity measurement hashes of one or more emails. Next the first similarity measurement hash and the sender hash of the first email are compared to a second similarity hash and a sender hash of a second email stored within the centralized storage system. Based on the comparison the process determines if the first similarity measurement hash of the first email matches the second similarity measurement hash of the second email and determines if the sender hash of the first email is different from the sender hash of the second email. If both of these are true the process marks the first email as a spam email.

In another embodiment a system for detecting spam email is disclosed. The system includes a first mail server configured to receive a first email. The system further includes a first spam filter configured to identify the first email as spam by comparing a similarity measurement hash and a sender hash for the first email to a second similarity hash and a second sender hash of a second email, and to mark the first email as spam when the similarity measurement hash and the second similarity measurement hash are the same and the sender hash and the second sender hash are different.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
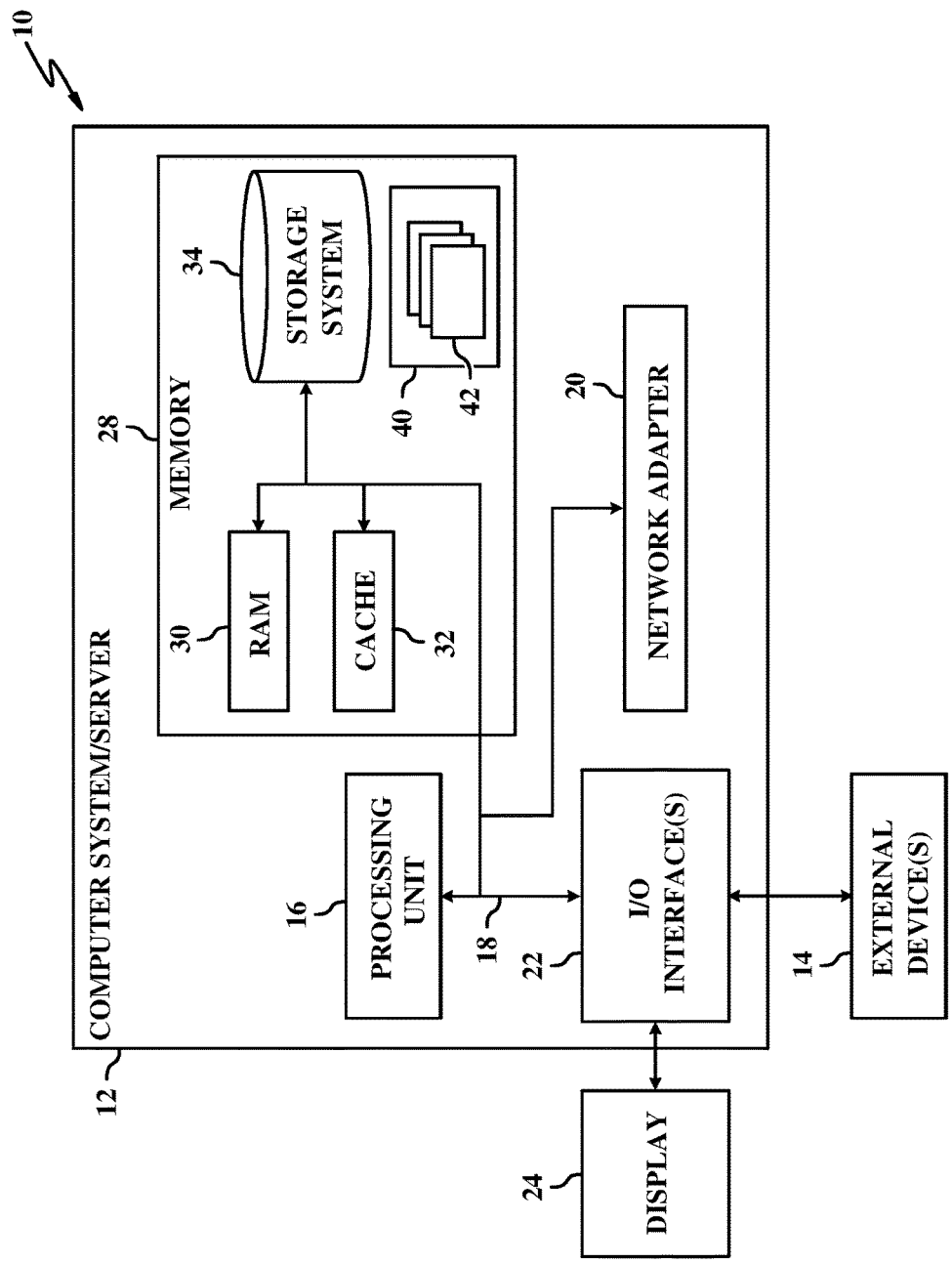
FIG. 1 depicts a cloud computing node, according to various embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to spam email detection as well as using sender information and similarity measurement information extracted from an email to determine if the email is to be classified as a spam email. The email may be given a 32-hexadecimal character hash within an enterprise network The 32-character hash may include a 16-character sender hash (following described as sender://0123456789abcdef), and a 16-character similarity measurement (SIM, following described as sim://0123456789abcdef) hash. The sender's hash may be used to prevent marking of legitimate emails as spam, as it is typical for newsletter or mailing lists having the same sender address. The SIM hash may be used to determine if a first email is similar to one or more emails. While the present disclosure is not necessarily limited to such applications, various aspects of the disclosure may be appreciated through a discussion of various examples using this context.

Embodiments of the disclosure relate to a multi-appliance environment wherein one or more computer system/servers are clustered to create a central data storage (e.g., an enterprise network). The centralized data storage may reside within a Domain Name System (DNS) that is connected to one or more user groups (e.g., companies), or computer systems/servers over the internet or within a private network. The DNS may assign domain names computers connected to the DNS and map those computers to internet resources.

The DNS may include Internet Protocol version 6 (IPv6) which is a communication protocol that provides identification and a location system for a computational device within a network and routes a connection between the computational device and one or more networks or computational devices over the Internet, or an intranet. Computational devices that are connected to the Internet may be assigned an IP address and in the case of an IPv6 the IP address is a 128-bit address that relates a combination of eight groups of four hexadecimal digits separated by colons resulting in a combination of 32 characters (following described as [0123:4567:89AB:CDEF: 0123:4567:89AB:CDEF]). Further herein, the terms IPv6 DNS, DNS, centralized storage system, and centralized storage node may be used interchangeably in regards to a system for storing hashes of emails which were received by one or more mail servers of the network.

To determine if an email is a spam email, a spam detection system may include a similarity threshold which may compare one or more emails within an observed email traffic. If a similarity threshold is reached, then the email may be marked as a spam email. To detect and mark a spam email, the spam detection system may need to determine if an email is a spam email. For the spam email detection system to determine if an email is a spam email, at least one spam email of a "spam chain" (or one or more similar spam emails) may have to be sent through the spam detection system before being compared to the rest of the spam chain. By maintaining a central data storage DNS to more rapidly identify spam emails as well as to provide a storage of other information regarding the spam emails, subsequent spam emails may be detected quickly and throughout a network that may have access to the central data storage DNS.

Using the method further outlined herein for spam detection, one or more clients use a shared DNS by combining the spam detection with a centralized storage. In this way the detection and identification of a spam message can be applied to one or more user groups connected to the DNS. If a user of a first user group receives a spam message, a spam filter module can mark the spam message such that this indication is accessible to each of the other user group connected to the DNS. In addition, when using a centralized data storage, such as an IPv6 DNS, previously detected spam emails may be maintained on the centralized data storage (e.g., a list of hashes) instead of having to rebuild the hash database at each mail server for each user group. In an example, an appliance may store the calculated hashes for a first mail server. If the appliance is shut down without saving hashes to a persistent storage, then when starting up, a few spam messages may pass through the spam filter of the first mail server while repopulating the similarity hash list.

When an email is sent to or within an enterprise network utilizing an IPv6 DNS as a centralized storage system for hashes of messages, a mail server may request the IPv6 DNS to report the combination of sender and SIM hash (e.g., the IPv6 address) to the centralized storage. After this request, the mail server may request the IPv6 DNS to lookup how often the same SIM hash has been seen from different sender hashes. The IPv6 DNS may store hashes correlating to the sender of the email, as well as similarity measurements (e.g., signatures, fingerprints, uniform resource locators (URLs) or combinations thereof) of the email's contents. For example, a hash may be thirty-two hexadecimal characters (32-character) in length and may be 20010DB885A308D313198A2E03707344, the first sixteen characters (16-character) 20010DB885A308D3 may be a sender hash correlating the hash to a sender address (or location) of the email's sender, and the second sixteen characters 13198A2E03707344 may be the similarity hash of the email. The content hash may be one or many content hashes which may be extracted as SIM hashes of the email. The full 32-character hash may be stored within a local cache and used during similarity measurement comparisons of the content hashes of the email. In various embodiments, the IPv6 DNS may also resolve internet domain names to IP addresses.

A similarity measurement (SIM) hash may be a signature 16-characters in length relating to at least one of the contents (or properties) of the email and may be used to compare one or more emails sent to or within the enterprise network. The SIM hash may include or point to the contents of an email as well as distinguishing characteristics of the email. The distinguishing characteristics of an email may include Uniform Resource Locators (URL), an order of email header entries, Hypertext Markup Language (HTML) of the email body, a structure of the email body, attached binaries or images and/or a normalized plain text of the email. Any of the distinguishing characteristics may be used singularly or in combination to create the SIM hash of the email. The SIM hash may then be compared to one or more other SIM hashes of one or more additional emails to determine if the email is a similar email. The SIM hash may point to a hash table within the local cache which may store SIM hashes of emails received by the DNS.

To determine if an email is a spam email, respective SIM hashes of respective emails may be compared. If two emails have a same SIM hash, then the email contents may be substantially similar. If one or more emails contain a same SIM hash, then the email may be marked as spam. For example, a first email may be reported to the DNS and may include a sender hash and a SIM hash of 203A0DD851A308D51389F82E007073AA the sender hash may be sender://203A0DD851A308D5 and the SIM hash may be sim://1389F82E007073AA. If a second email is received with a sender and SIM hash of 305B45EF5A1409951389F82E007073AA having the same SIM hash of sim://1389F82E007073AA then the second email may be marked as a spam email. In various embodiments, the computer system may also locate the first email and mark the first email as a spam email.

SIM hashes may include one or more attributes of the email. Attributes of an email may include but are not limited to header, order of entries, structure (e.g., body structure and HTML structure), normalized plain text, normalized uniform resource locators (URLs), attachments, and keyword structure. The attributes of the email may be defined as one or more SIM hashes and stored. For example, an attribute of the normalized plain text of an email may be placed into a SIM hash of sim://25AB5C4D6EF3A6B4 while an attribute of the attachments of the email may have a SIM hash of sim://1A3BC64D98EE8F4D. The SIM hashes may then be compared to other stored SIM hashes to determine if the email is spam.

An additional check may be made to determine if the sender hash of the email with the same SIM hash is different from the previous sender hash. If two emails have a same SIM hash, then the sender hashes may be checked to see if they are the same. If the sender hashes are not the same, the email may be marked as spam. For example, a first email may include a hash of 62AB564A51A395C11389D82E007073FF and a second email may include a hash of ABB52CDE6FFA33651389D82E007073FF. The sender hashes of the first email and the second email are different, but the SIM hashes sim://1389D82E007073FF are the same. Resulting in a first email and a second email with a substantially similar content but sent by different users.

The SIM hash detection methods may be utilized in unison when creating the SIM hash or separately. When creating a SIM hash one or more detection methods may make up the SIM hash wherein a first email could have only one hash (one sender hash and one SIM hash) or multiple hashes with a same sender hash and different SIM hashes.

In various embodiments, the spam email detection may require SIM hashes of two or more emails to match in order to characterize the two or more emails as spam. If only one SIM hash of a first email and a second email match, then the email may not be determined as spam, even if the sender hashes are different. For example a first email may have a first hash of 203A0BC851A308D51389F82E007073AA and a second email may have a second hash of 2A56B895643C07781389F82E007073AA wherein both the first and second email have a same SIM hash of sim://1389F82E007073AA. Although these two emails share one SIM hash subsequent checks between the SIM hashes of the two emails, it is determined that no other SIM hashes match. As such, the email may then not be determined as spam. For example, the SIM hash of sim://1389F82E007073AA may relate to an attached image that everyone in a company uses in their email signature. In various embodiments, to prevent overblocking, the SIM hash of sim://1389F82E007073AA may be whitelisted because many emails may include that SIM hash. It should be noted that emails having a matching SIM hash may be determined not to be spam based on other factors such as user defined exclusions, automated exclusions, etc.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein. Program module 42 can be executed on one or more processors.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via input/output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
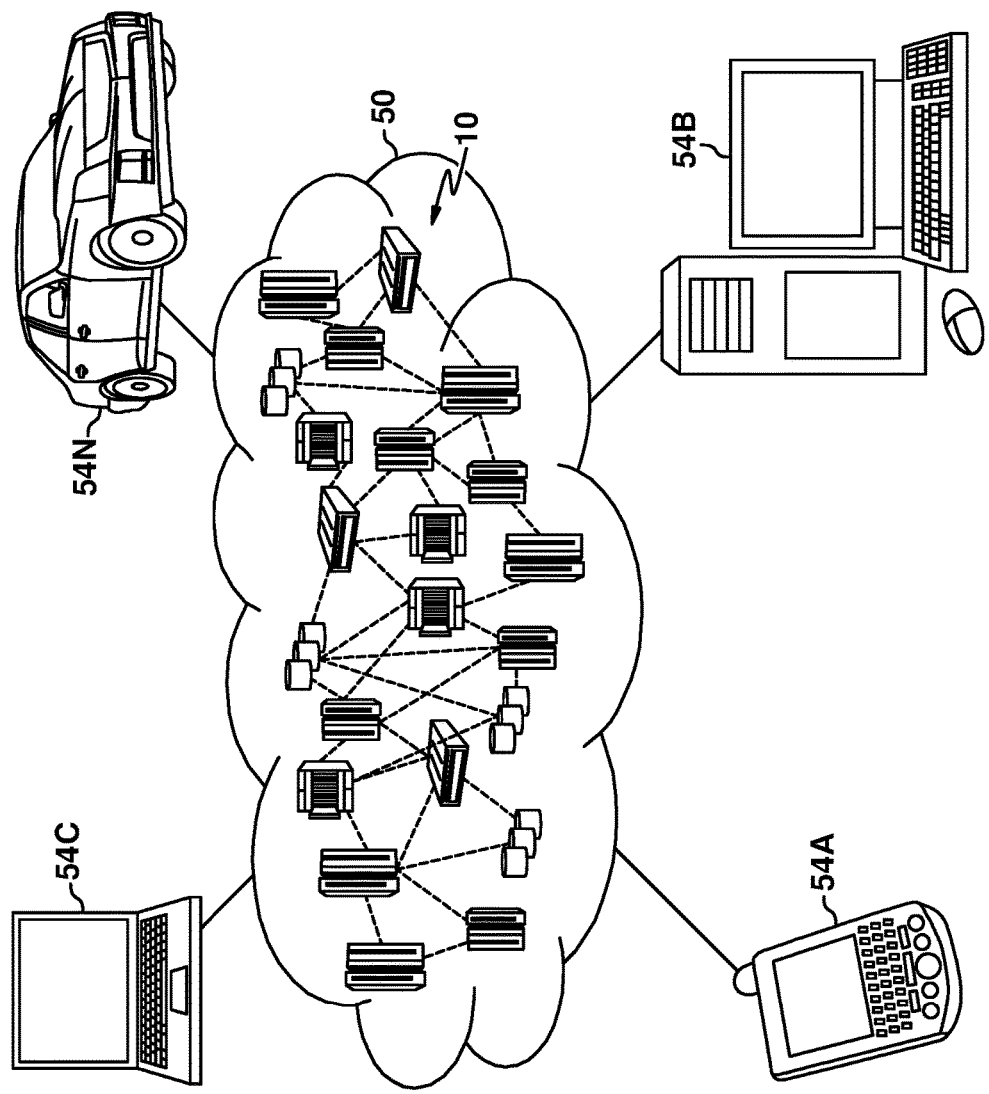
FIG. 2 depicts a cloud computing environment, according to various embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
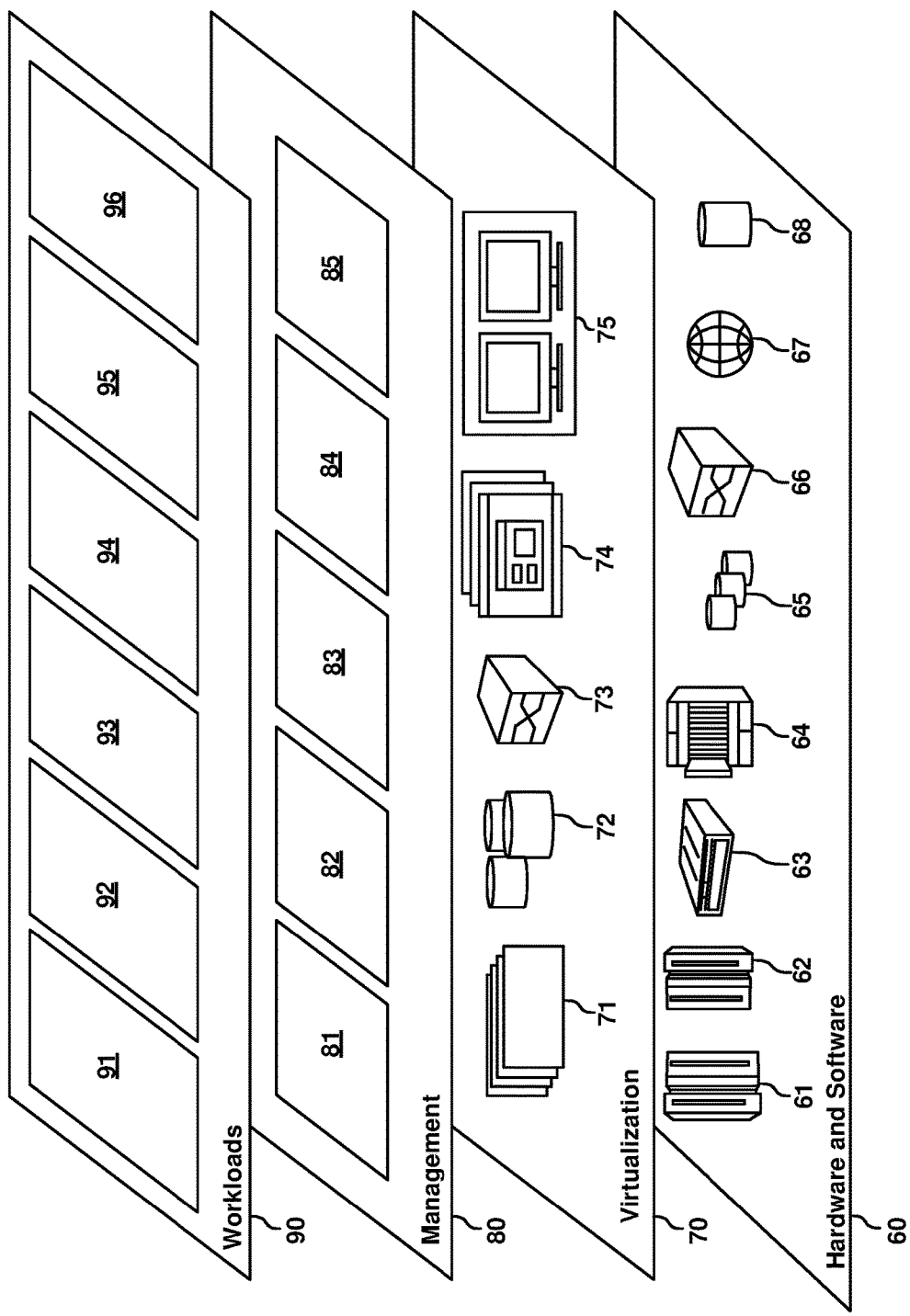
FIG. 3 depicts abstraction model layers, according to various embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database 96. The database 96 of the workload layer 90 may include an IPv6 DNS for storing a centralized list of detected spam messages.

Figure 4:
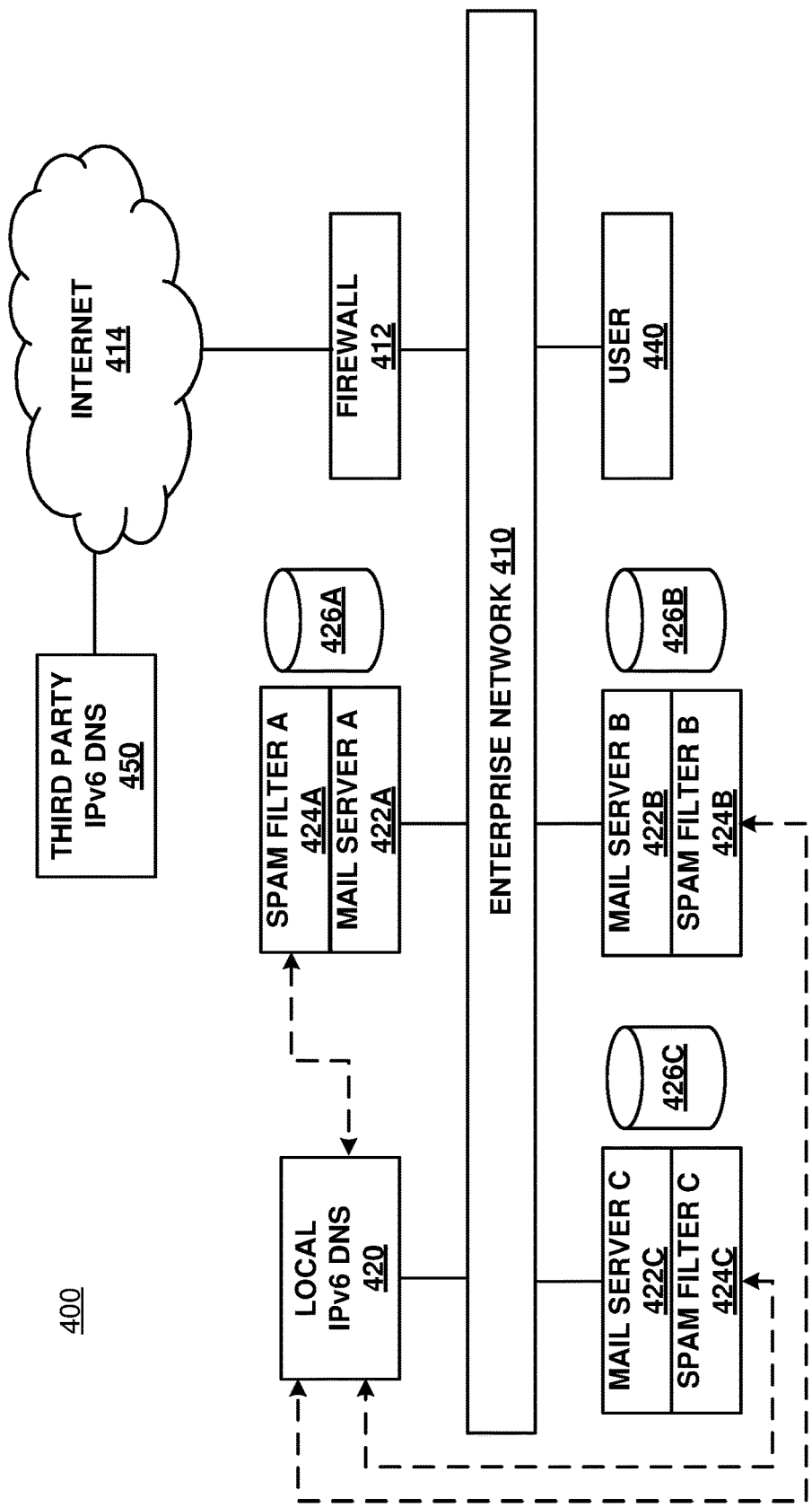
FIG. 4 depicts an enterprise network email system, according to various embodiments of the present disclosure.

FIG. 4 depicts an enterprise network email system, according to embodiments. The enterprise network email system 400 may include an enterprise network 410 connecting one or more computer systems or servers (e.g., computer system/server 10 of FIG. 1) connected to the enterprise network. The one or more systems connected to the enterprise network 410 may include one or more mail servers 422A, 422B, 422C (collectively mail server 422), a local IPv6 DNS 420, and a user 440. The enterprise network 410 may be connected to the Internet 414, wherein a firewall 412 is placed between or within the enterprise network.

The Internet 414 may also connect to a third party IPv6 DNS 450. The third party IPv6 DNS 450 may also connect one or more systems or users to the Internet 414. The third party IPv6 DNS 450 may provide identification and a location system for computers or servers on other networks and route a "traffic" (e.g., the flow of data across the internet) between them. The traffic may include sending emails, connecting users to web pages, and/or data sent between computers.

The firewall 412 may protect the enterprise network 410. The firewall 412 may be a network security system which may monitor and control incoming and outgoing network traffic based on security rules. The security rules of the firewall may define which traffic is trusted and untrusted. The firewall 412 may be a software appliance running on a computer system/server separate from or within the one or more mail servers of the enterprise network 410. The firewall 412 may protect the users connected to the enterprise network from traffic outside the enterprise network or the Internet 414.

The one or more mail servers 422 may include a first mail server 422A (mail server A), a second mail server 422B (mail server B), and one or more additional mail servers 422C (mail server C). Each of the one or more mail servers 422 may include a spam filter 424 and a local cache 426. The first mail server 422A may connect to a first spam filter 424A (spam filter A) and may include a first local cache 426A. The second mail server 422B may connect to a second spam filter 424B (spam filter B) and may include a second local cache 426B. The third mail server 422C may connect to a third spam filter 424C (spam filter C) and may include a third local cache 426C.

A mail server 422 (e.g., the first mail server 422A) may receive an email to be distributed to a user 440 connected to the mail server. The mail server may be a program module (e.g., program module 42, of FIG. 1) of a program (e.g., program 40, of FIG. 1) capable of receiving incoming emails and distributing them to users. The email may be processed by the spam filter 424 (e.g., first spam filter 424A) connected to the mail server 422 and determined to be either a spam email or not a spam email. The spam filter 424 may also be a program module configured to determine if an email received by the mail server 422 is a spam email. The email when received by the spam filter may report the sender hash and the SIM hash of the email to the local IPv6 DNS 420 and the local cache 426 (e.g., first local cache 426A). The local IPv6 DNS 420 may store sender hashes, SIM hashes, and combination sender and SIM hashes of one or more emails received within the enterprise network 410, described further herein. If the email is determined not to be a spam email, then the mail server 422 may be distributed the email to the user 440. If the email is determined to be a spam email, then the spam filter 424 may mark the email as spam and sending the sender hash and the SIM hash to the local IPv6 DNS. The spam email may then be distributed as a spam email or removed from the enterprise network 410 depending on the configurations of the mail server receiving the spam message.

The local IPv6 DNS 420 may be a centralized storage of sender hashes and SIM hashes for the spam filters 424 of the mail servers 422 of the enterprise network 410 and may store the sender hashes and SIM hashes of emails sent to and within the enterprise network. An email may be received by a mail server 422 and a SIM hash of the email may be compared to one or more SIM hashes of other emails stored within the IPv6 DNS (see FIG. 5). The comparison may include querying the local IPv6 DNS 420 to determine if the SIM hash of a new email matches a SIM hash of another email previously received within the enterprise network 410. For example, a second spam filter 424B may query the IPv6 DNS 420 regarding a second email received at the second mail server 422B. The query of the IPv6 DNS 420 may be used to determine if the SIM hash of the second email matches a SIM hash of another email within the IPv6 DNS.

Figure 5:
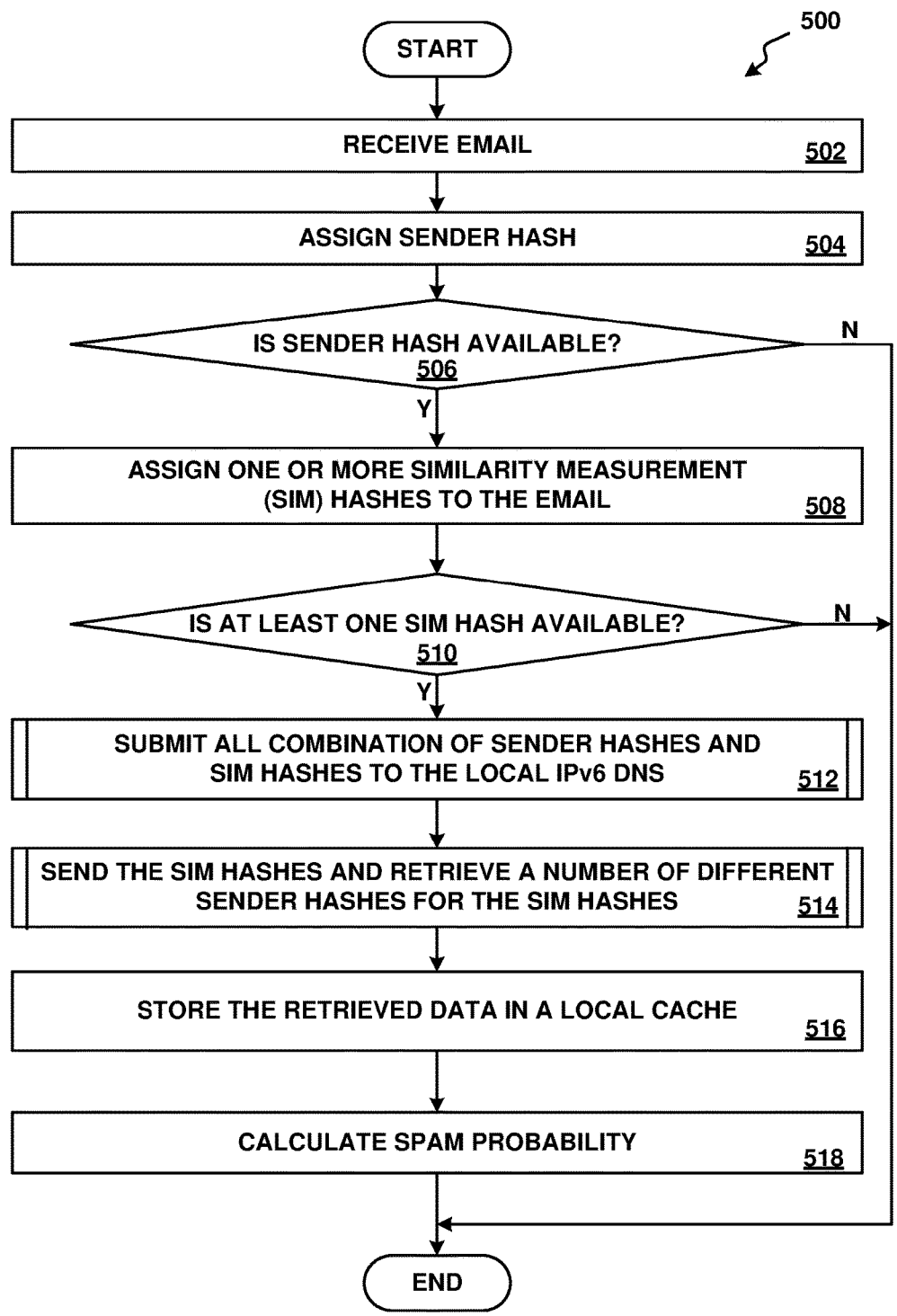
FIG. 5 depicts a flowchart for determining if an email is a spam email, according to various embodiments of the present disclosure.
Figure 7:
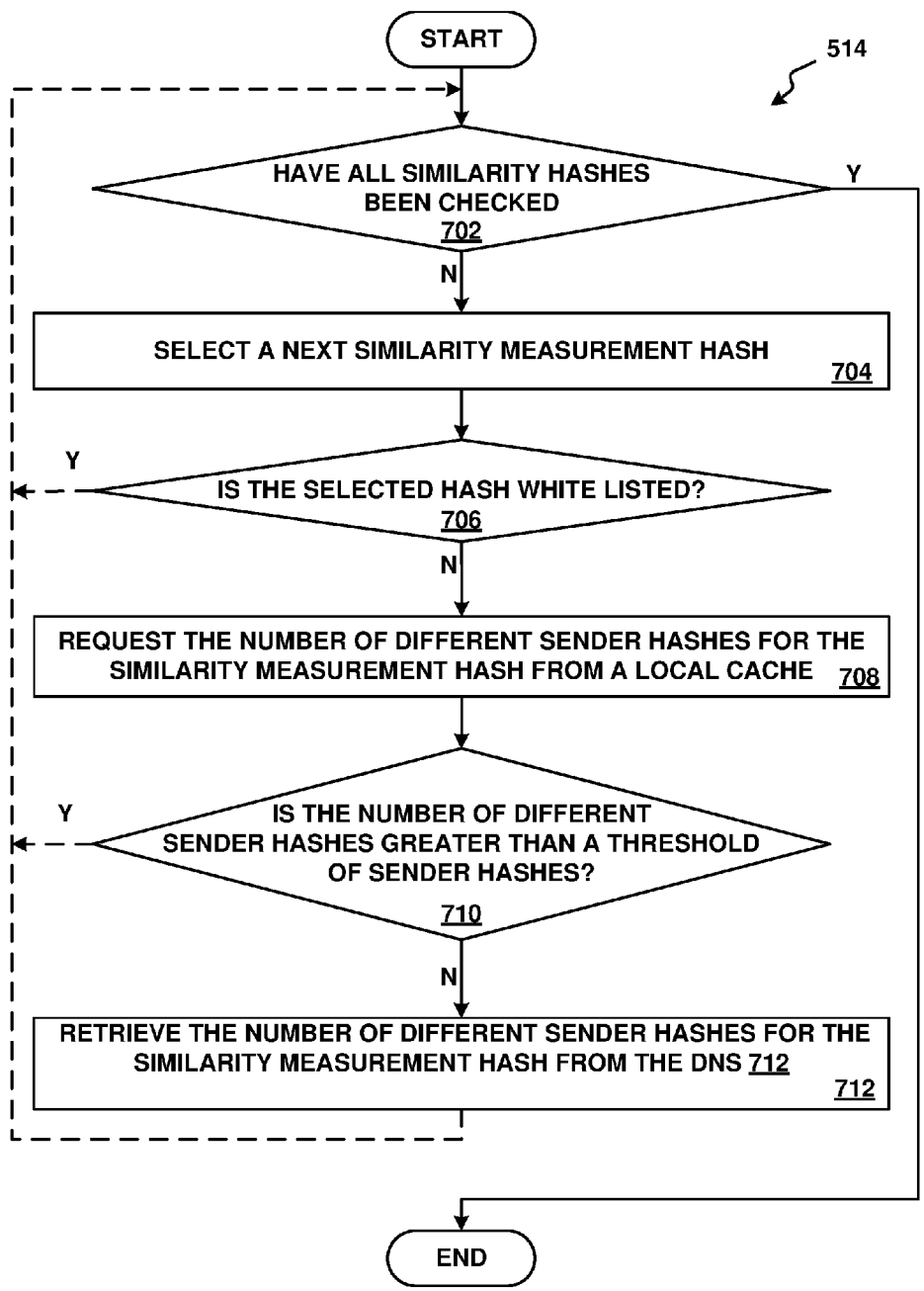
FIG. 7 depicts a flowchart for requesting a similarity measurement of hashes and retrieving a number of different sender hashes, according to various embodiments of the present disclosure.

FIG. 5 depicts a flowchart for determining if an email is a spam email, according to embodiments. The method 500 may include receiving an email and creating a sender hash and a SIM hash of the email. The email may then be determined if the email is spam and marked accordingly. The sender hash and the SIM hash may then be queried (or requested) from the DNS upon a retrieval of a second email within the enterprise network to compare the sender and SIM hash combination of the second email (FIG. 7).

In operation 502, an email is received. The email may be received by a mail server (e.g., first mail server 422A, FIG. 4). The mail server may receive one or more emails being sent to/from users (e.g., user 440, FIG. 4) within the enterprise network (e.g., enterprise network 410, of FIG. 4) or from the Internet (e.g., Internet 414, FIG. 4).

In operation 504, a sender hash of the email is assigned. The sender hash may include a sixteen-character identifier for the sender of the email. Upon receiving the email, the sender of the email may be placed into a hash table and given a sender hash. The sender hash may identify the sender address of the email when queried. For example, a first mail server may receive a first email and the sender address of the email may be linked to a first sender hash of sender:// 66AB8E4CDD437EFD.

In operation 506, a determination is made if the sender hash is available. If a sender hash is not calculated in operation 504 or not available from operation 504, then the method 500 may end. If the sender hash is calculated in operation 504 and is available, then the method 500 may progress to operation 508. Determining if the sender hash is available may include checking if the sender hash exists within a centralized storage of known spam emails.

In operation 508, one or more SIM hashes are assigned to one or more properties of the email. The mail server may calculate (or create) one or more SIM hashes for the email. A single email may include multiple SIM hashes which may pertain to different properties of the email. For example, a first SIM hash of a first email may be sim:// 0AB45CD6EFA3884B which may point to the two URLs within the body of the first email, and a second SIM hash of the first email may be sim://ABC34DE2FA60BC43 which may point to the signature block of the email. In an additional example, a second email may have only a single SIM hash of sim://888844AA3DDF22BD pointing to the normalized plain text of the email body.

In operation 510, a determination is made if at least one SIM hash is available. If a SIM hash of the email is not created in operation 508 (i.e. is not available), then the method 500 may end. If at least one SIM hash of the email was created in operation 508 (i.e. is available), then the method may progress to operation 512.

Figure 6:
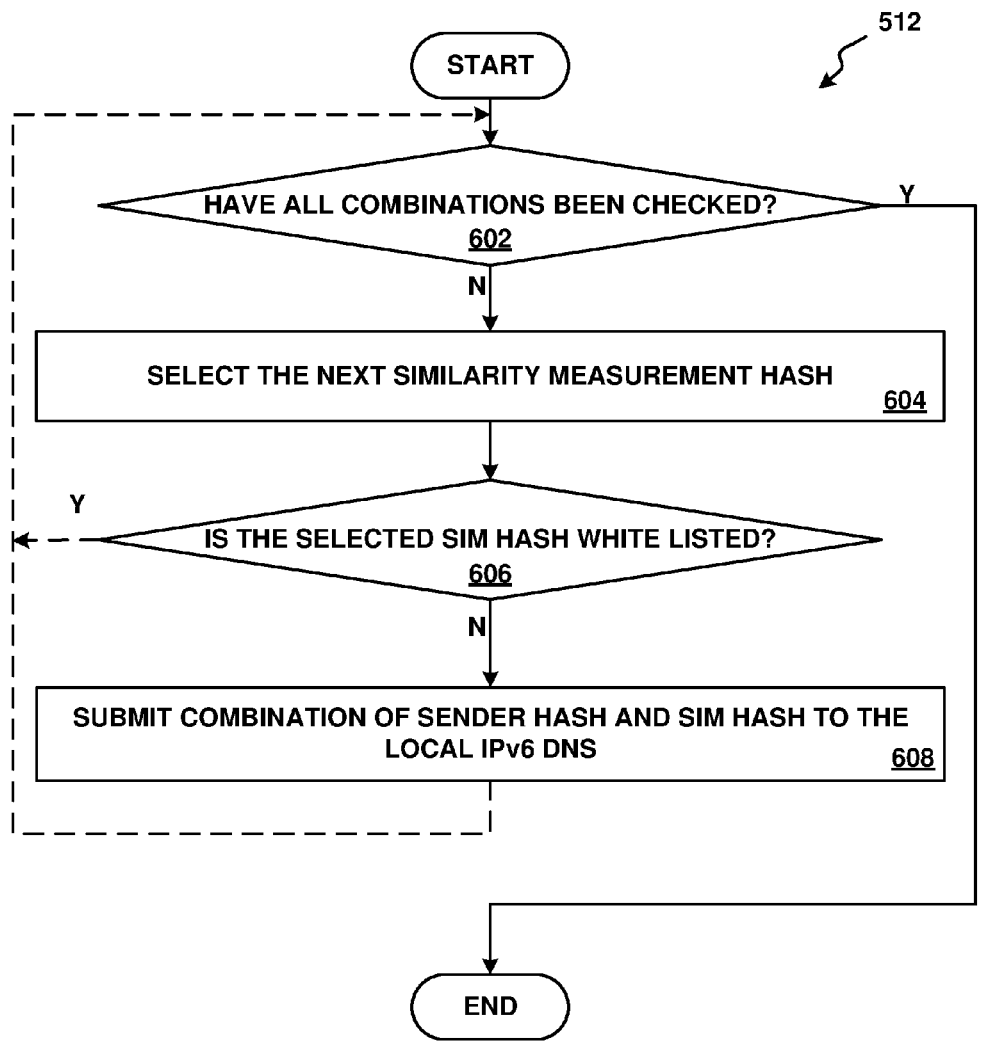
FIG. 6 depicts a flowchart for requesting a combination of sender hashes and similarity measurement hashes, according to various embodiments of the present disclosure.

In operation 512, each combination of the sender hash and the SIM hash may be sent to the DNS (An example of the process executed at this step is illustrated in FIG. 6). The DNS may store the sender hashes and SIM hashes for each email received within the enterprise network. For each email, the sender hash and corresponding SIM hashes connected to the sender hash for that email may be sent to and stored within the DNS. For example, a first email may have a sender hash of sender://66AB8E4CDD437EFD and two SIM hashes including a first SIM hash of sim:// 0AB45CD6EFA3884B which may point to the two URLs within the body of the first email, and a second SIM hash of sim://ABC34DE2FA60BC43 which may point to the normalized plain text of the email. The first email may be logged into the DNS with two 32-character sender and SIM hash combinations of 66AB8E4CDD437EFDABC3-4DE2FA60BC43 for the first combination and 66AB8E4CDD437EFD0AB45CD6EFA3884B for the second combination.

In various embodiments, the DNS may be a local IPv6 DNS (e.g., local IPv6 DNS 420, FIG. 4). The local IPv6 DNS may be queried to request one or more matching combinations of sender and SIM hashes of the email. The method 500 may utilize the local IPv6 DNS to store and request sender hashes and SIM hashes of emails received throughout the enterprise network even if the mail servers do not interact with each other directly. Thus, the local IPv6 DNS may allow for spam determination across multiple separate mail servers. For example, a mail server A of a first company may utilize a spam message detected in a mail server B of a second company. An example of this would be where the DNS is published and maintained by a third party. Both companies would contribute to the DNS their detected spam emails. In this way the first company and the second company are able to detect spam based on the detections of the other company. Even if the messages were received though different mail servers that have no interconnection other than the local IPv6 DNS, the mail server A may gather SIM hashes of emails received by Company B and mark spam messages accordingly.

In operation 514, one or more sender hash and SIM hash combinations are retrieved from the DNS matching the SIM hash of the email. A spam filter may gather the SIM hash of the email retrieved upon the mail server (e.g., spam filter A 424A and mail server A 422A, of FIG. 4). The SIM hash of the email may then be sent to the DNS of the enterprise network. The DNS may look up the SIM hash of the email stored within the DNS and then the DNS may return a number, corresponding to one or more sender hashes corresponding to the one or more matched SIM hashes to the spam filter of the mail server.

In various embodiments, the SIM hash sent to the DNS may be logged on the DNS and used for additional comparison with other SIM hashes of emails (An example of the process executed at this step is illustrated in FIG. 7). When sending the SIM hash and sender hash to the DNS, the DNS may log the sender hash and the SIM hash within a hash table which may be used for similar comparisons with subsequent emails received by any mail server within the enterprise network (e.g., the first mail server 422A, the second mail server 422 B, and the third mail server 422C, of FIG. 4).

In operation 516, the retrieved data is stored within a local cache. The local cache (e.g., the first local cache 426A, FIG. 4) may store the data retrieved from the DNS. The data may include SIM hashes of emails with number of sender hashes matching the SIM hash. The local cache may store the sender hashes and SIM hashes which may be used to determine if the email is spam. This determination may be made based on a comparison of the sender hash and the SIM hash of the email with the cached versions. When there is a match with the SIM hashes within the local cache the mail may be determined to be spam. The local cache may store SIM hashes of emails received by the mail server and the corresponding number of different sender hashes, previously retrieved from the DNS.

In various embodiments, the local cache may store the (sender hashes and) SIM hashes received by the DNS to determine if subsequent emails are spam. Without having to query the DNS, the mail server may first search the local cache of the mail server (e.g., the first local cache 426A and the first mail server 422A) to determine if the email is spam. If a SIM hash of the email matches a SIM hash stored on the local cache, then the DNS may not be queried. If a SIM hash of the email does not match a SIM hash stored on the local cache, then the DNS may be queried. In some embodiments the DNS may be queried regardless of the presence of the SIM hash in the local cache.

In operation 518, the spam probability of the email is calculated. The email may then be determined as a spam email or as a non-spam email. If a SIM hash of the email matches one or more SIM hashes of one or more emails known to be spam, then the email may be marked as spam and distributed accordingly in the mail server. If the SIM hash does not match another SIM hash of the one or more SIM hashes of the one or more emails known to be spam, then the email may not be marked as spam and distributed accordingly.

In various embodiments, the SIM hash of the email may match a SIM hash of second email but the second email may not have been determined as a spam email. If one or more SIM hashes of the email match one or more SIM hashes of one or more additional emails, then the sender hashes as well as one or more SIM hashes of the emails may be compared. For example, an email may be determined as spam if three or more conditions are met. Conditions may include both emails having different sender hashes and same SIM hashes. Same SIM hashes may include attributes of the two or more emails attributes may include a same URL following a paragraph of text, a same HTML structure, a same plain text. If two emails include different senders, a same HTML structure SIM hash, and a same plain text SIM hash, then both emails may be determined as spam.

FIG. 6 depicts a flowchart for submitting a combination of sender hashes and SIM hashes, according to embodiments. The method 512 may send one or more hashes of the email to the local IPv6 DNS (e.g., local IPv6 DNS 420 of FIG. 4). The hash may include a 32-character combination of a 16-character sender hash and 16-character SIM hash of the email. Each hash of the email may then be sent to the IPv6 DNS.

In operation 602, a determination is made if all sender and SIM hash combinations have been checked. A sender and SIM hash combination may include a 32-character combination of a 16-character sender hash and 16-character SIM hash of the email. The first 16-characters of the 32-character hash may be the 16-character sender hash and the second 16-characters of the 32-character hash may be the SIM hash. A single email may include one sender and SIM hash combinations, each including a same 16-character sender hash, and different 16-character SIM hashes. For example, a first email may include 2 different 32-character hashes each with a same 16-character sender hash and different 16-character SIM hashes. However, any number of hashes may be presented. If all of the 32-character hash combinations have been checked, then the method 512 may end at the END operation. If not all of the 32-character hash combinations have been checked, then the method 512 may progress to operation 604.

In operation 604, the next SIM hash is selected. If a first SIM hash has been checked, then a second SIM hash may be selected. For example, an email may have 10 different 32-character sender and SIM hash combinations. The first 32-character combination hash may be 06549AB345CD4EF2567E3A7BCDE5889F and the second 32-character combination hash may be 06549AB345CD4EF24AB334CD89EFA96B. The sender hash is the same in the first and second 16-character sender hash of sender://06549AB345CD4EF2, and the second 16-characters of the SIM hash are sim://567E3A7BCDE5889F for the first SIM hash and sim://4AB334CD89EFA96B for the second SIM hash.

In operation 606, a determination is made if the hash is white listed. The white listing of the hash may include a white listing of the sender hash, the SIM hash, or both the sender hash and the SIM hash (e.g., the combined sender and SIM hash). White listing may be stored on the local cache of the mail server (e.g., local cache 426A of FIG. 4). In various embodiments, the white listing may be stored on the local IPv6 DNS and may still require the sender and SIM hash to be sent to the local IPv6 DNS but determined as white listed from there (e.g., operation 706, of FIG. 7). If the hashes (sender, SIM, or both) are white listed, then the email may not be determined as spam. For example, if the 16-character sender hash of sender://06549AB345CD4EF2 is white listed on the local cache, then all emails including the sender hash of sender://06549AB345CD4EF2 may be white listed and not sent to the local IPv6 DNS for spam determination. If the selected SIM hash is white listed, then the method 512 may return to operation 602 where a determination may be made if all sender and SIM hash combinations have been checked. If the selected SIM hash is not white listed, then the method 512 may progress to operation 608.

In various embodiments, the SIM hash of the email may be determined to be white listed. If the 16-character SIM hash is determined to be white listed, then the SIM hash may be disregarded in the spam determination of the email. For example, a white listed SIM hash may include a signature block or company images used by the company operating the mail server within the enterprise network.

In operation 608, the combination of sender and SIM hashes are submitted to the local IPv6 DNS. If the selected sender and SIM hash combination is not white listed, then the sender and SIM hash combination may be sent to the local IPv6 DNS. The local IPv6 DNS may then store the sender and SIM hash combination to be compared against other sender and SIM hash combinations to determine if one or more emails are spam.

FIG. 7 depicts a flowchart for requesting a similarity measurement of hashes and retrieving a number of different sender hashes, according to embodiments. The flowchart may be a method 514, which may include requesting sender and SIM hash combinations from both a local cache (e.g., local cache 426A, FIG. 4) of a mail server (e.g., the first mail server 422A, of FIG. 4), and the local DNS (e.g., the local IPv6 DNS 420, of FIG. 4) of the enterprise network (e.g., the enterprise network 410, of FIG. 4). The request may be used for querying a local IPv6 DNS (e.g., local IPv6 DNS 420, of FIG. 4) to determine if a SIM hash matches a SIM hash already stored within the local IPv6 DNS.

In operation 702, a determination is made if all the SIM hashes of an email have been checked. If all the SIM hashes have been checked, then the method 514 may proceed to the END, and complete. If all the SIM hashes have not been checked, then the method 514 may proceed to operation 704.

In operation 704, the next SIM hash is selected. If a first SIM hash has yet to have been checked, then the first SIM hash may be selected for comparing the SIM hash with one or more additional SIM hashes. The first SIM hash may then be used for the method 514.

In operation 706, a determination is made if the SIM hash is white listed. If the SIM hash is white listed, then the method may return to operation 702 wherein the determination is made if all of the SIM hashes of the email have been checked. If the SIM hash is not whitelisted, then the method 514 may progress to operation 708.

In operation 708, a number of different sender hashes for the SIM hash are requested from a local cache. A mail server may include a local cache. The local cache may store the sender and SIM hash combinations of emails, including spam emails and regular emails. For example, the local cache may contain the sender and SIM hash of every email that has been received by the mail server. The local cache may not contain sender and SIM hash combinations that are stored in other various mail servers within the enterprise network. In various embodiments, when an email is marked as spam the sender and SIM hash combination may be distributed to each local cache of each mail server within the enterprise network.

In operation 710, a determination is made if the number of different sender hashes with matching SIM hashes is greater than a threshold of sender hashes. This process acts to reduce the amount of time for determining if the email is a spam email. The determination may be made if the local cache of the mail server has one or more different sender hashes for the SIM hash than the threshold of different sender hashes to trigger the spam determination. If the number of different sender hashes is greater than the threshold, then the method 514 may return to operation 702, where the Local IPv6 DNS may not be queried. If the number of different sender hashes is not greater than the threshold, then the method 514 may progress to operation 712.

In operation 712, the number of different sender hashes for a SIM hash are retrieved from the DNS. The spam filter then may determine based on that number that the email is a spam email. If the number of different sender hashes exceeds a threshold of the number of different sender hashes, then the SIM hash may be marked as spam. If the SIM hash is marked as spam, then the email pertaining to that SIM hash may be marked as spam.

Figure 8:
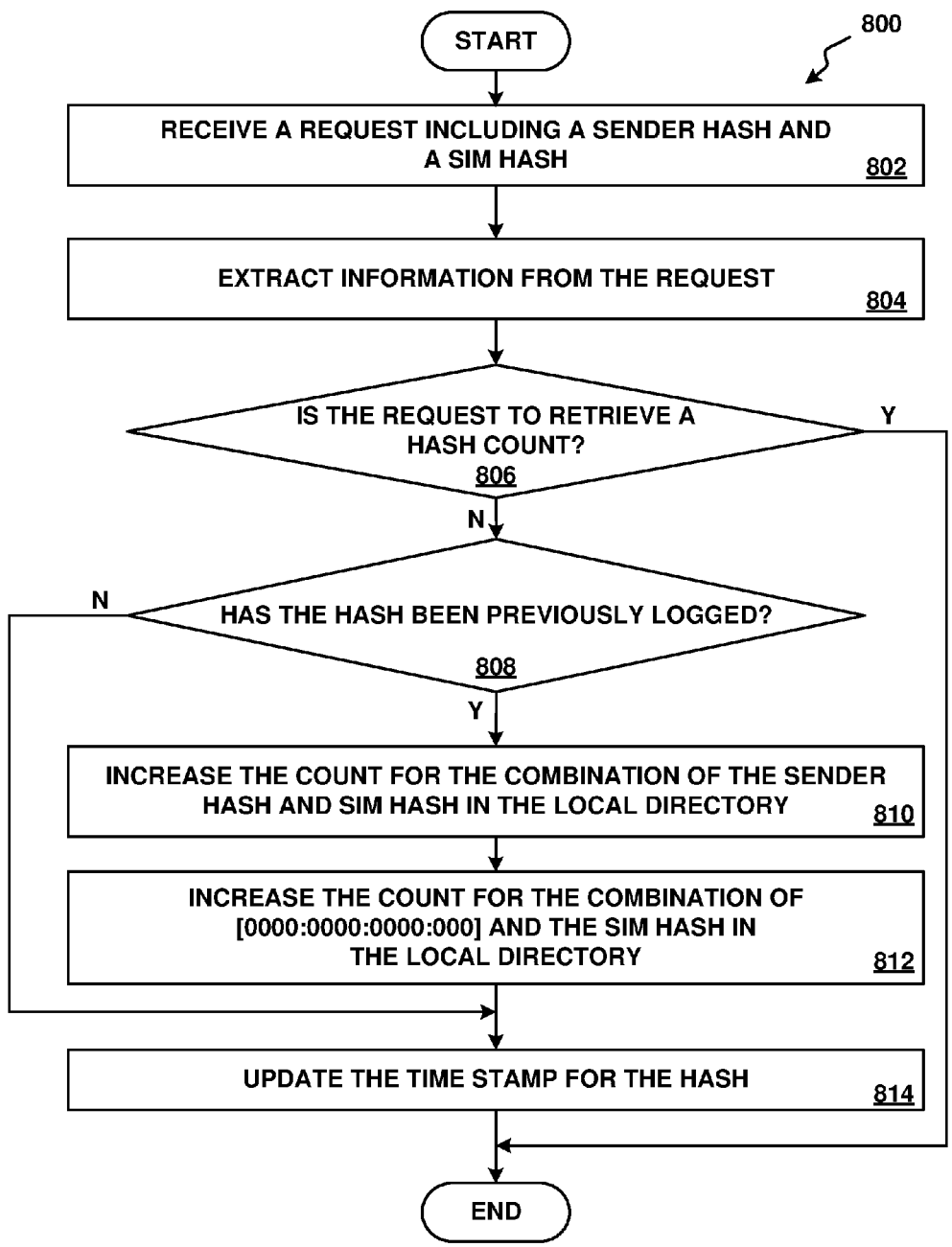
FIG. 8 depicts a flowchart for updating DNS entries according to various embodiments of the present disclosure.

FIG. 8 depicts a flowchart of a method 800 for updating DNS entries, according to embodiments. Upon the reception of an email by a mail server (e.g., the first mail server 422A, FIG. 4) the email may be logged into the DNS (e.g., the local IPv6 DNS 420, FIG. 4) as an entry. The entry may then be stored and requested when a sender hash or SIM hash matches a second email received within the network (e.g., the enterprise network 410, FIG. 4).

In operation 802, a request including a sender hash and a SIM hash is received. The request may be an email, a retrieval, or another function. If the request is an email, then the request may include a sender hash and a SIM hash. If the request is a retrieval, then the sender hash may be a retrieval hash, and the SIM hash may relate to the retrieval request.

In operation 804, the information of the request is extracted. If the request is an email, then the sender hash and the SIM hash may be extracted from the email. If the request is a retrieval hash, then the SIM hash may be extracted from the retrieval request. For example, a retrieval request may be a 16-character sender hash with all the characters being 0, i.e., sender://0000000000000000. The second 16 characters of the 32-character sender hash and SIM hash combination of the retrieval request may be a 16-character SIM hash.

In operation 806, a determination is made if the extracted information is a retrieval request or an email. If the extracted information indicates that the request is a retrieval request, then the flowchart may progress to the END. If the extracted information indicates that the request is not a retrieval request (e.g., an email) then the method 800 may progress to operation 808.

In operation 808, a determination is made if a hash, (e.g., a sender hash, a SIM hash, or a sender hash and SIM hash combination) has been previously logged in the local directory (e.g., a Local IPv6 DNS). A hash may be previously logged in the local directory if the hash has been received through another email received by a mail server within the network. If the hash was previously logged, then the method 800 may progress to operation 810. If the hash was not previously logged, then the method 800 may progress to operation 814.

In operation 810, the count for the sender hash and SIM hash combination is increased. Since the combined sender and SIM hash was determined to already exist within the local directory, then the count may be increased. The sender and SIM hash combination may increase the count by one. Each email containing the same sender and SIM hash may increase the count by one. For example, if the same email was sent from one sender individually to ten recipients then the 10 separate emails may include a same sender and SIM hash as a combined sender and SIM hash. The count for the combined sender and SIM hash may increase by ten.

In operation 812, the count for the request hash and the SIM hash combination is increased. An empty sender hash of sender://0000000000000000 combined with a SIM hash may be logged within the local directory. The empty sender and SIM hash combination may be used to determine if a SIM hash is logged within the local directory. When checking to see if a SIM hash is within the local directory, a user (or a computer system) may issue a request, including an empty sender hash sender://0000000000000000 and the SIM hash the user is requesting. For example the user may issue a request, wherein the combined request and SIM hash may be 00000000000000008AB59CDE42FF32AB where the sender hash is sender.//0000000000000000 and the SIM hash is sim://8AB59CDE42FF32AB.

In operation 814, the time stamp for the hash is updated. The time stamp may be issued irrespective of whether the hash is already within the local directory or not within the local directory. The time stamp may indicate the time the email (sender and SIM hash combination), or request hash was last received. If this is the first instance of the sender and SIM combination, then the first instance may include a first (or initial) time stamp. If this is not the first instance of the sender and SIM combination, then the subsequent instance may include an update to the time stamp, and in certain embodiments, each time stamp of the sender and SIM combination may be maintained.

Figure 9:
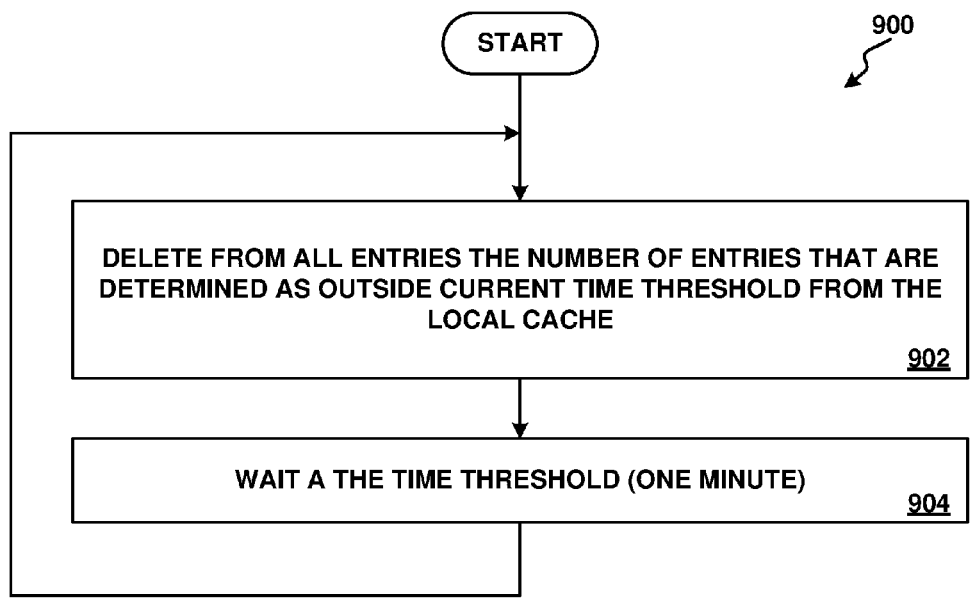
FIG. 9 depicts a flowchart for deleting old DNS entries, according to various embodiments of the present disclosure.

FIG. 9 depicts a flowchart for deleting old DNS entries, according to embodiments. When a DNS entry has aged past a time period, then the DNS entry may be deleted from the DNS to maintain space for new incoming entries according to the method 900. The time period may be adjusted based on the configurations set by a network administrator.

In operation 902, all entries that were added (or updated) outside the last time threshold are deleted from the DNS. If an entry has not been updated since the last time period, then the entry may be deleted. For example, the time period may be 60 seconds. Thus, if the entry was updated more than 60 seconds ago, then the entry may be deleted.

In operation 904, the DNS waits a time threshold until determining again which DNS entries may be deleted. If the time period is 60 seconds, then the system may wait 60 seconds until returning to operation 902 to determine if one or more entries may be deleted.

In various embodiments, whether or not entries are deleted is determined based on the DNS time stamp, the current time, and the time threshold. If a time stamp falls below the time threshold then the entry may be deleted from the DNS. For example, if a time stamp indicates that an entry was last updated 45 seconds ago, and the threshold is 60 seconds, then the entry may not be deleted. In an additional example, if a time stamp indicates that an entry was last updated 61 seconds ago and the threshold is 60 seconds, then the entry may be deleted.

By using a time window, the spam detection may include overblocking protection. Overblocking protection may prevent non-spam emails from being determined as spam. For example, forwarded emails may be detected as spam if a white listing operation is not available. If a first sender sends a first email, and a second sender sends the same first email, then the emails may be detected as spam due to SIM hashes of the first email being the same or substantially similar, or including multiple same SIM hashes. If a time window is used, then as long as the forwarded message is sent outside the time window both emails may be determined as non-spam emails.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for determining if an email is a spam email, the method comprising:
   receiving a first email at a first mail server;
   creating a first sender hash of the first email;
   creating one or more similarity measurement hashes of the first email including a first similarity measurement hash, wherein the first similarity measurement hash further comprises:
      gathering one or more properties of the first email;
      combining one or more of the properties of the first email into the first similarity measurement hash of the first email;
      wherein the one or more properties are selected from the group consisting of header entries, email structure, normalized plain text, normalized uniform resource locators, and attachments; and
      wherein the first sender hash and first similarity measurement hash are a combined hash of a 32-character fixed length hash;
   querying a centralized storage system for one or more similarity measurement hashes of one or more emails, wherein the centralized storage is a domain name system;
   connecting one or more mail servers to the domain name system;
   querying the domain name system from a first mail server of the one or mail servers to retrieve a second sender hash and a second similarity measurement hash that was developed in a second mail server of the one or more mail servers
   comparing the first similarity measurement hash and the first sender hash of the first email to the second similarity hash and the second sender hash of a second email stored within the centralized storage system;
   determining, in response to comparing, that the first similarity measurement hash of the first email matches the second similarity measurement hash of the second email;
   determining, in response to comparing, that the first sender hash of the first email is different from the second sender hash of the second email;
   marking, in response to determining that the first similarity measurement hash matches the second similarity measurement hash and the first sender hash is different from the second sender hash, the first email as a spam email;
   determining that the second email has been received by the mail server; and
   marking the second email as a spam email, in response to marking the first email as spam email.

* * * * *